US011829519B1

(12) United States Patent
Moschella

(10) Patent No.: US 11,829,519 B1
(45) Date of Patent: Nov. 28, 2023

(54) SYSTEMS, METHODS, AND APPARATUSES FOR A WEARABLE CONTROL DEVICE TO FACILITATE PERFORMANCE OF MANUFACTURING AND VARIOUS MOTOR TASKS

(71) Applicant: META PLATFORMS TECHNOLOGIES, LLC, Menlo Park, CA (US)

(72) Inventor: Anthony D. Moschella, Booklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 410 days.

(21) Appl. No.: 16/805,589

(22) Filed: Feb. 28, 2020

Related U.S. Application Data

(60) Provisional application No. 62/811,888, filed on Feb. 28, 2019.

(51) Int. Cl.
*G06F 3/00* (2006.01)
*G05B 19/042* (2006.01)
*G06F 1/16* (2006.01)
*G06V 20/20* (2022.01)
*G06F 3/01* (2006.01)

(52) U.S. Cl.
CPC .......... *G06F 3/011* (2013.01); *G05B 19/0425* (2013.01); *G06F 1/163* (2013.01); *G06V 20/20* (2022.01)

(58) Field of Classification Search
CPC .... G06F 3/04883; G06F 3/04845; G06F 3/20; G06K 9/222

USPC .......................................................... 345/156
See application file for complete search history.

(56) References Cited

U.S. PATENT DOCUMENTS

2020/0143120 A1* 5/2020 Nguyen ............. G06K 7/10297
2020/0234813 A1* 7/2020 Orr ........................ G16H 50/30

OTHER PUBLICATIONS

M. Mura et al., An Integrated Environment Based on Augmented Reality and Sensing Device for Manual Assembly Workstations, Procedia CIRP, vol. 41, 2016, pp. 340-345, ISSN 2212-8271, https://doi.org/10.1016/j.procir.2015.12.128; https://www.sciencedirect.com/science/article/pii/S221282711501207X (Year: 2016).*

* cited by examiner

*Primary Examiner* — Mark Edwards
(74) *Attorney, Agent, or Firm* — Greenberg Traurig, LLP

(57) ABSTRACT

Methods, systems, and apparatuses for providing feedback to a human operator during performance of a manufacturing or other motor task. The system comprises a plurality of neuromuscular sensors configured to collect or record a plurality of neuromuscular signals from the human operator, wherein the plurality of neuromuscular sensors are arranged on one or more wearable devices, and at least one computer processor programmed to determine, based on the plurality of neuromuscular signals and/or information based on the plurality of neuromuscular signals, one or more metrics associated with a performance of the manufacturing or motor task by the human operator, and provide via an extended reality interface such as an augmented reality (AR) interface, feedback to the human operator regarding their performance of the manufacturing task, wherein the feedback is based, at least in part, on the determined one or more metrics.

20 Claims, 10 Drawing Sheets

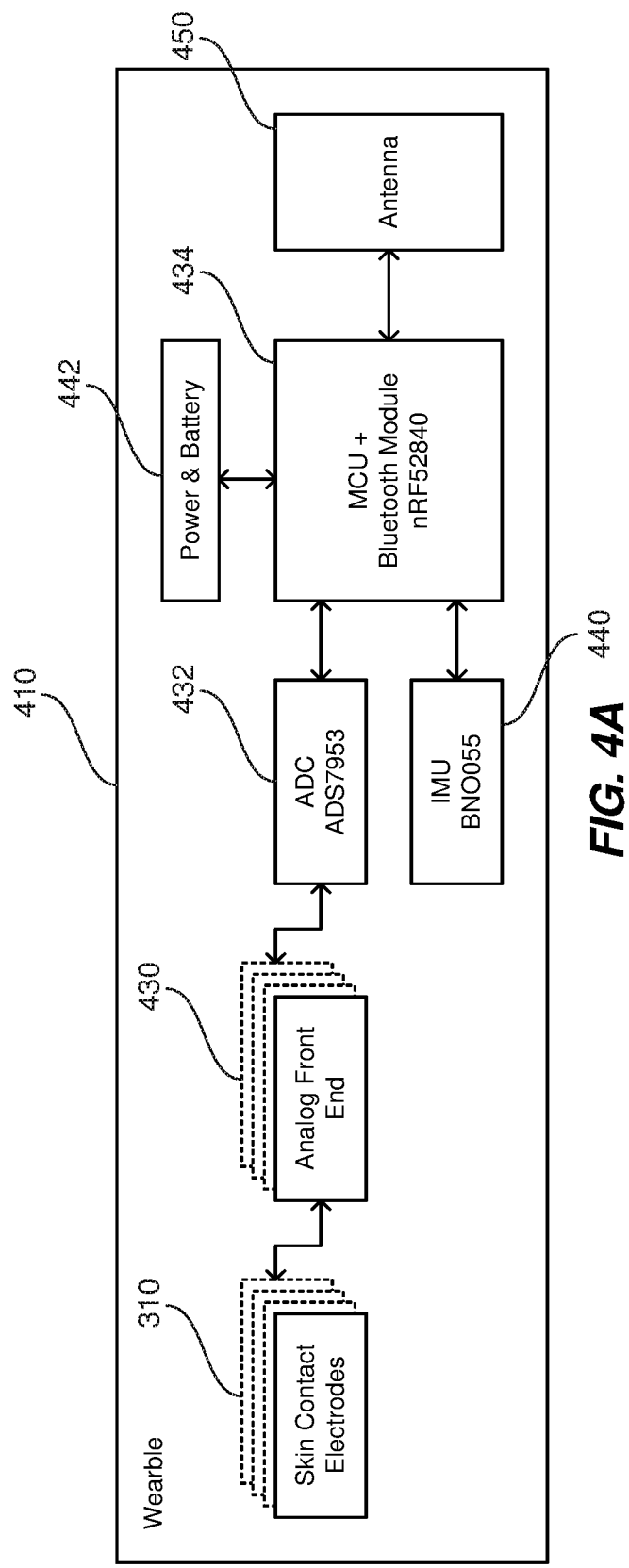
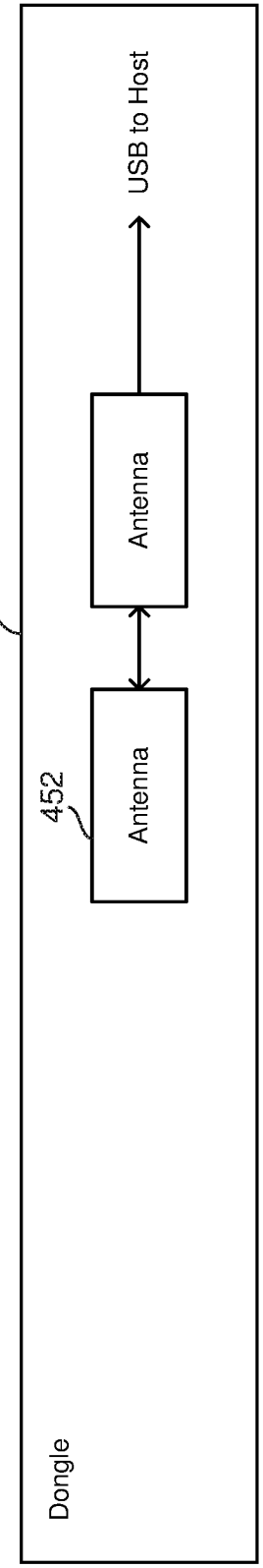
FIG. 4A
FIG. 4B

SYSTEMS, METHODS, AND APPARATUSES FOR A WEARABLE CONTROL DEVICE TO FACILITATE PERFORMANCE OF MANUFACTURING AND VARIOUS MOTOR TASKS

CROSS REFERENCE TO RELATED APPLICATION

This application claims the benefit of U.S. Provisional Application No. 62/811,888, filed 28 Feb. 2019, the disclosure of each of which is incorporated, in its entirety, by this reference.

BACKGROUND

In some computer applications that generate representations of the human body, it is desirable for the application to know the spatial positioning, orientation and movement of a user's body to provide a realistic representation of body movement. For example, in a virtual reality (VR) environment, tracking the spatial position of the user's hand enables the application to represent hand motion in the VR environment, which allows the user to interact with (e.g., by grasping or manipulating) virtual objects within the VR environment. Such systems can be inadequate for training and performance applications. Accordingly, there exists a need for improved systems, methods, and apparatus that allow for training and better performance of manufacturing and various motor tasks.

SUMMARY

Manufacturing tasks performed, for example, by human operators on assembly lines are typically repetitive tasks that if performed in a consistent manner results in the production of high-quality products. Failure to perform such manufacturing tasks in a consistent manner may result in product defects such as missing parts, wrong parts, errors in setting up work pieces, and equipment failures. Although product defects can result from multiple factors, human error caused by carelessness, fatigue, or lack of experience is a significant source of such defects. Thus, systems are needed to mitigate human-based errors in manufacturing systems that affect the quality of products. Methods and apparatuses are described herein including wearable devices operatively coupled to a virtual or augmented reality environment to solve at least some of the aforementioned challenges.

Some embodiments are directed to a system for providing feedback to a human operator during performance of a manufacturing task. The system comprises a plurality of neuromuscular sensors configured to record a plurality of neuromuscular signals from the human operator, wherein the plurality of neuromuscular sensors are arranged on one or more wearable devices; and at least one computer processor programmed to determine, based on the plurality of neuromuscular signals and/or information based on the plurality of neuromuscular signals, one or more metrics associated with a performance of the manufacturing task by the human operator, and provide via an extended reality interface such as an augmented reality (AR) interface, feedback to the human operator regarding their performance of the manufacturing task, wherein the feedback is based, at least in part, on the determined one or more metrics.

In at least one aspect, the at least one computer processor is further programmed to: provide as input to a trained statistical model, the plurality of neuromuscular signals and/or information based on the plurality of neuromuscular signals, and determine, based on an output of the trained statistical model, the one or more metrics associated with the performance of the manufacturing task.

In at least one aspect, the one or more metrics associated with the performance of the manufacturing task include information about a force applied by the human operator during performance of the manufacturing task.

In at least one aspect, the one or more metrics associated with the performance of the manufacturing task include information describing one or more movements performed by the human operator during performance of the manufacturing task.

In at least one aspect, the one or more metrics associated with the performance of the manufacturing task includes information associated with a position of at least a portion of the human operator relative to a manufactured component during performance of the manufacturing task.

In at least one aspect, the at least one computer processor is further programmed to monitor an angle of the at least a portion of the human operator relative to the manufactured component during performance of the manufacturing task.

In at least one aspect, the at least one computer processor is further programmed to monitor at least six degrees of freedom of an arm and/or hand of the human operator during performance of the manufacturing task.

In at least one aspect, the one or more metrics associated with performance of the manufacturing task include information associated with a posture of the human operator during performance of the manufacturing task.

In at least one aspect, providing feedback to the human operator via an augmented reality interface comprises instructing an AR device in communication with the at least one computer processor to provide the feedback to the human operator in an augmented reality environment generated by the AR device.

In at least one aspect, the AR device comprises a second wearable device configured to generate a graphical user interface to display the feedback to the human operator.

In at least one aspect, providing feedback to the human operator comprises displaying one or more visual prompts to the human operator via the AR interface, the one or more visual prompts including one or more instructions regarding the performance of the manufacturing task.

In at least one aspect, providing feedback to the human operator comprises prompting the human operator to change an amount of force applied during performance of the manufacturing task.

In at least one aspect, providing feedback to the human operator comprises providing one or more instructions to the human operator regarding an amount of force to be applied during performance of the manufacturing task.

In at least one aspect, providing feedback to the human operator comprises providing a notification to the human operator indicative of whether the manufacturing task was completed properly by the human operator.

In at least one aspect, providing feedback to the human operator further comprises, when it is determined that the manufacturing task was not completed properly, providing, via the AR interface, instructions describing how to complete the manufacturing task properly.

Some embodiments are directed to a system for training a human operator to perform a manufacturing task. The system comprises a wearable device including a plurality of neuromuscular sensors configured to record a plurality of neuromuscular signals from the human operator, an extended reality system such as an augmented reality (AR)

system or a virtual reality (VR) system, and at least one computer processor in communication with the plurality of neuromuscular sensors and the AR or VR system. the at least one computer processor is programmed to instruct the AR or VR system to provide at least one prompt to the user about proper performance of the manufacturing task, and provide feedback to the human operator regarding whether the human operator has properly performed the manufacturing task, wherein the feedback is determined based, at least in part, on the plurality of neuromuscular signals and/or information derived from the plurality of neuromuscular signals during performance of the manufacturing task.

In at least one aspect, providing feedback to the human operator comprises providing feedback via the AR or VR system during performance of the manufacturing task.

In at least one aspect, the at least one computer processor is further programmed to monitor based, at least in part, on the recorded neuromuscular signals, a force applied to a manufactured part by the human operator during performance of the manufacturing task, and providing feedback to the human operator comprises providing information describing the monitored force.

In at least one aspect, the at least one computer processor is further programmed to monitor based, at least in part, on the recorded neuromuscular signals, a position of at least a portion of the human operator relative to a manufactured part during performance of the manufacturing task, and providing feedback to the human operator comprises providing information describing the monitored position.

Some embodiments are directed to a method for providing feedback to a human operator during performance of a manufacturing task. The method comprises recording, via a plurality of neuromuscular sensors, a plurality of neuromuscular signals from the human operator, wherein the plurality of neuromuscular sensors are arranged on one or more wearable devices, determining, based on the plurality of neuromuscular signals and/or information based on the plurality of neuromuscular signals, one or more metrics associated with a performance of the manufacturing task by the human operator, and providing via an augmented reality (AR) interface, feedback to the human operator regarding their performance of the manufacturing task, wherein the feedback is based, at least in part, on the determined one or more metrics.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

FIGS. 4A and 4B schematically illustrate components of a computer-based system on which some embodiments are implemented. FIG. 4A illustrates a wearable portion of the computer-based system and FIG. 4B illustrates a dongle portion connected to a computer, wherein the dongle portion is configured to communicate with the wearable portion.

DETAILED DESCRIPTION

Figure 1:
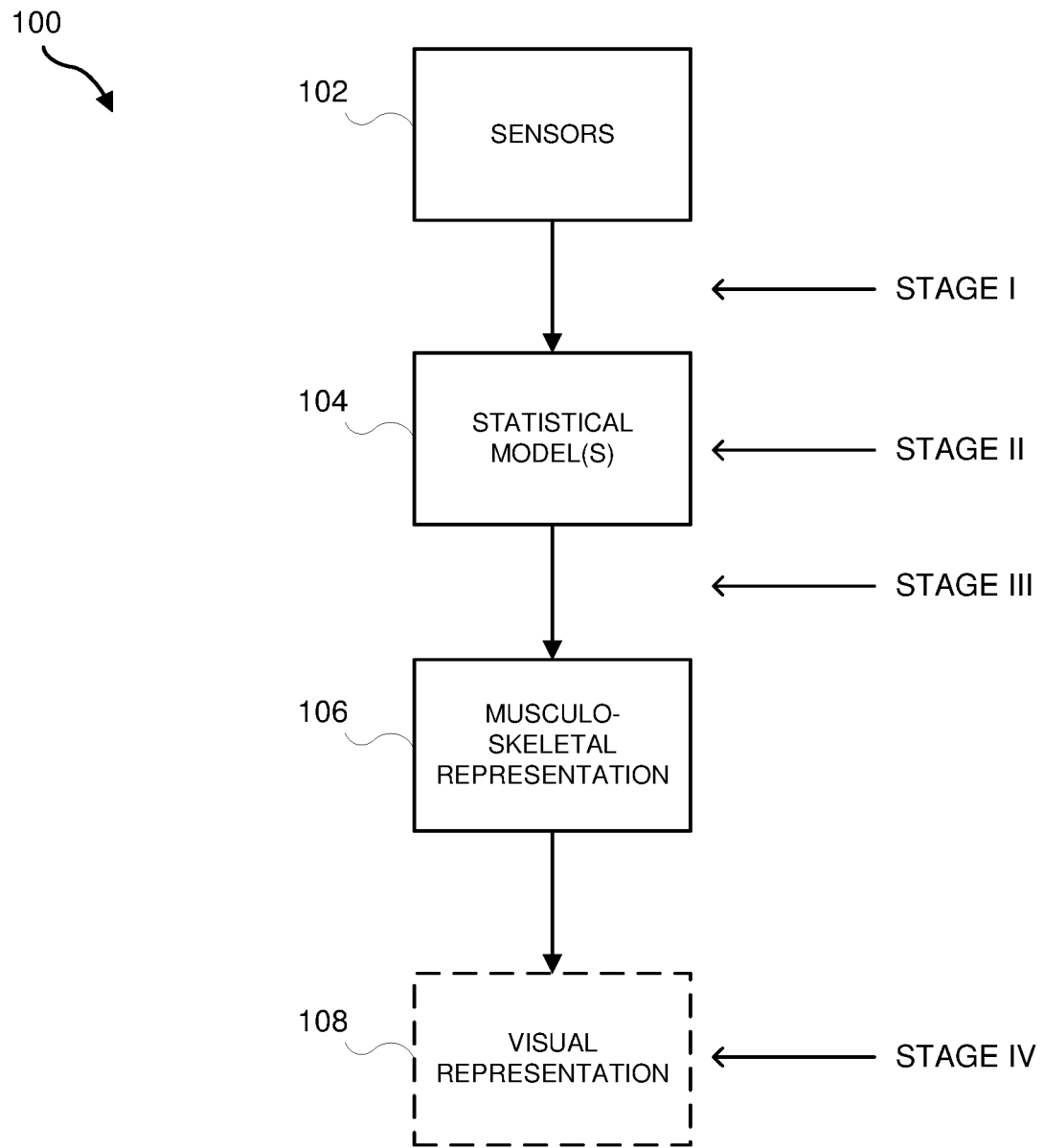
FIG. 1 is a schematic diagram of a computer-based system for reconstructing handstate information in accordance with some embodiments of the technology described herein.

In spite of recent advances in automation, traditional assembly lines remain a key element of manufacturing systems. The quality of products is an important concern in such manufacturing systems which often depends on the manner in which processes are carried out in assembly lines. Some common product defects originating at the assembly line level include omitted assembly processes, missing parts, wrong parts, errors in setting up work pieces, and equipment failures. Although product defects can result from multiple factors, human error caused by carelessness, fatigue, or lack of experience is a significant source of such defects. Thus, systems are needed to mitigate human-based errors in manufacturing systems that affect the quality of products. Methods and apparatuses are described herein including wearable devices operatively coupled to an extended reality environment, such as virtual or augmented reality environment to solve the aforementioned challenges. In other embodiments, the disclosed systems and methods can be applied to other motor-related tasks outside of assembly and manufacturing, e.g., surgical or medical tasks, military-related tasks, or any other motor task that can benefit from real-time or after-the-fact feedback following performance of the task(s).

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints that regulate how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using at least one of a trained statistical model, a trained machine learning model, or a combination thereof, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

In some examples, systems described herein may augment, combine, and/or compare a musculoskeletal representation of an operator with a representation of one or more physical components with which the operator interacts and/or which the operator accommodates. Examples of such physical components may include tools used by the operator, components that the operator assembles, environmental objects around which the operator works, etc. Accordingly, it may be understood that where systems described herein observe, predict, visualize, evaluate, and/or represent a musculoskeletal representation of an operator, these systems may, in some examples, be extended to include representations of one or more physical components, such as the aforementioned.

Certain exemplary embodiments described herein can be used for multiple purposes in a manufacturing or assembly system. For example, extended reality systems, such as mixed reality, virtual and/or augmented reality systems described herein can be used to train assembly line operators on how to properly use industrial machinery, assemble products, and perform other suitable manufacturing tasks. In such a case, trainees can receive adequate feedback based on several movement metrics processed by the wearable device including whether the task was successfully completed, economy of movement, applied forces, and accuracy. As discussed and described herein, the alerts and feedback as described herein can be presented to the users within that extended reality environment to assist with training and improving performance of the operators and users for any given task or set of tasks. For example, an augmented reality environment can be implemented to be used with the wearable devices described herein such that an assembly line operator is supported during the manufacturing process including the display of visual indicators to orient an operator with respect to how to assemble a specific part and receive feedback regarding current performance. Other applications are considered and described in more detail below.

FIG. 1 illustrates a system 100 in accordance with some embodiments. The system includes a plurality of sensors 102 configured to record signals resulting from the movement of portions of a human body. Sensors 102 may include autonomous sensors. As used herein, the term "autonomous sensors" refers to sensors configured to measure the movement of body segments without requiring the use of external devices. In some embodiments, sensors 102 may also include non-autonomous sensors in combination with autonomous sensors. As used herein, the term "non-autonomous sensors" refers to sensors configured to measure the movement of body segments using external devices. Examples of external devices used in non-autonomous sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of the body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model and/or a machine learning model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only include a plurality of neuromuscular sensors (e.g., EMG sensors). In other embodiments, sensors 102 include a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

System 100 also includes one or more computer processors (not shown in FIG. 1) programmed to communicate with sensors 102. For example, signals recorded by one or more of the sensors may be provided to the processor(s), which may be programmed to execute one or more machine learning techniques that process signals output by the sensors 102 to train one or more statistical models 104 and/or machine learning models (not shown in FIG. 1), and the trained (or retrained) statistical or inferential model(s) 104 may be stored for later use in generating a musculoskeletal representation 106, as described in more detail below. As used herein, the term statistical or inferential model includes, but is not limited to, pure statistical models, pure machine learning models, or any combination thereof. Non-limiting examples of statistical or inferential models that may be used in accordance with some embodiments to predict handstate information based on recorded signals from sensors 102 are discussed in detail below.

System 100 also optionally includes a display controller configured to display a visual representation 108 (e.g., of a hand). As discussed in more detail below, one or more computer processors may implement one or more trained statistical models configured to predict handstate information based, at least in part, on signals recorded by sensors 102. The predicted handstate information is used to update the musculoskeletal representation 106, which is then optionally used to render a visual representation 108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. Not all embodiments of system 100 include components configured to render a visual representation. For example, in some embodiments, handstate estimates output from the trained statistical model and a corresponding updated musculoskeletal representation are used to determine a state of a user's hand (e.g., in a virtual reality environment) even though a visual representation based on the updated musculoskeletal representation is not rendered (e.g., for interacting with virtual objects in a virtual or augmented reality environment in the absence of a virtually-rendered hand). Accordingly, certain embodiments as described herein do not rely on the musculoskeletal visual representation(s) and instead rely solely or primarily on collected and processed neuromuscular data and one or more trained inferential machine learning models. In these or any of the exemplary embodiments, feedback to the user can be presented in any suitable way including but not limited to visual, auditory, haptic, and/or other sensory feedback.

In some embodiments, a computer application configured to simulate a virtual reality environment may be instructed to display or render a visual representation of the user's hand within a user interface (e.g., a graphical user interface). Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 102 and processed by the trained statistical model(s) 104 to provide an updated computer-generated representation of the user's position, movement, and/or exerted force that is updated in real-time.

As discussed above, some embodiments are directed to using one or more statistical or inferential models for predicting musculoskeletal information based on signals collected and processed from wearable autonomous sensors. The statistical model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally, or alternatively, the constraints may be learned by the statistical or inferential model though training based on ground truth data on the position and exerted forces of the hand and wrist in the context of recorded sensor data (e.g., EMG data alone or EMG data combined with other sensory data or camera-based images).

Constraints imposed in the construction of the inferential or statistical models are those set by anatomy and the physics of a user's body, while constraints derived from statistical patterns are those set by human behavior for one or more users from which sensor measurements are measured and used to train the statistical model. As described in detail below, the constraints may comprise part of the statistical model itself being represented by information (e.g., connection weights between nodes) in the model.

As discussed above, some embodiments are directed to using a statistical or inferential model for predicting handstate information to enable the generation and/or real-time update of a computer-based musculoskeletal representation. The statistical model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Individuals using systems such as those described in connection with FIG. 1 may have personal characteristics sometimes discernable in recorded sensor signals. Such personal characteristics may include sensitive information associated with these individuals or may be embarrassing for or be used to otherwise identify these individuals, for example, in a virtual reality environment or augmented reality environment. The personal characteristics may include short-term or instantaneous characteristics (such as muscle fatigue, muscle scale, or frequency content) and long-term characteristics (such as a personally identifiable pattern of neuromuscular data, tremors, or other movement patterns). The inventors have discovered that anonymizing the sensor data recorded from a user via neuromuscular sensors and/or other sensors by removing or masking these personal characteristics from the recorded sensor data would protect the privacy of a user. For example, anonymizing sensor data recorded from a user may enhance the individual's virtual or augmented reality experience by protecting their identity and/or masking a personal characteristic as rendered in the virtual or augmented reality environment.

As discussed above, signals recorded by one or more sensors 102 may be provided as input to one or more trained inferential or statistical models 104 that are configured to predict handstate information based on the signals. The predicted handstate information is used to update the musculoskeletal representation 106, which is then used to render a visual representation 108 based on the updated musculoskeletal representation incorporating the current handstate information but not the one or more personal characteristics. In some embodiments, the removal or masking of the personal characteristics (i.e., anonymizing of sensor data) may be performed at various stages of the signal processing pipeline of system 100, for example, indicated as stages I, II, III, and IV in FIG. 1.

According to some embodiments, the one or more computer processors of system 100 may be programmed to perform anonymization by processing raw signals and/or preprocessed (e.g., amplified and/or filtered) signals (e.g., neuromuscular signals) recorded from the sensors 102 (indicated as stage I in FIG. 1). The signals and/or information based on the signals may be processed to remove or mask the personal characteristics of a user. In these embodiments, the personal characteristics are removed from the signals prior to providing these signals as input to the trained statistical model(s) 104. In other words, the signals may be anonymized and the anonymized signals may be provided as input to the trained statistical model(s) 104. As such, the musculoskeletal representation 106 updated based on output model estimates is also an anonymized musculoskeletal representation from which the personal characteristics have been removed/masked.

In some embodiments, anonymizing raw neuromuscular signal data (or processed neuromuscular signal data via filtering, normalization, or other forms of signal processing) can be implemented in a manner that removes a personal characteristic of the user while retaining features in the raw or processed neuromuscular data that can be used to derive meaningful information when used as an input to a statistical model as described herein. Anonymizing raw or pre-processed neuromuscular data can be beneficial because any subsequent transmission of the anonymized data in the downstream data pipeline maintains privacy with respect to the masked personal characteristic.

In some embodiments, the personal characteristics may include short-term or instantaneous characteristics of a user, such as, muscle fatigue, muscle scale, muscle activity level, muscle frequency content, muscle spiking patterns, and/or other characteristics. In some cases, these short-term or instantaneous characteristics may arise due to or in response to the user's use of the system. For example, an assembly line operator that have worked for an extended period of time may experience muscle fatigue, which may be assessed from the signals recorded by the sensors 102.

In other embodiments, the personal characteristics may include long-term characteristics of the user, such as tremors or other movement patterns associated with neurological disorders or non-pathological idiosyncrasies, characteristics resulting from diseases or medications, or other characteristics of the user's motor system, such as motor unit action potential waveforms. In yet other embodiments, the personal characteristics may include a body mass index and/or body fat percentage of the user, skin conductance of the user, muscle tone of the user, pulse rate of the user, blood pressure of the user, physical characteristics, such as finger and limb lengths, and/or other characteristics.

In some implementations, the one or more computer processors may include or communicate with one or more detector circuits that are programmed to analyze or process the signals to identify or detect the personal characteristics in the signals. For example, a first detector circuit may be provided to identify at least one movement pattern (associated with a tremor, for example) in the neuromuscular signals and/or information based on the neuromuscular signals. In some embodiments, a power spectrum calculated from the user's neuromuscular sensor data may indicate the presence of a tremor. A second detector circuit may be provided to detect muscle fatigue from the neuromuscular signals and/or information based on the neuromuscular signals. Similarly, other detector circuits may be provided for detecting other personal characteristics from neuromuscular signals or other signals.

According to some embodiments, system 100 also includes at least one storage device that is configured to store the recorded sensor data and/or the one or more statistical model(s). In some embodiments, personal characteristics are removed from the recorded sensor data (e.g., personal characteristics that an assembly line operator does not want to share with his or her employer such as, neurological disorders for example) prior to storage of sensor data in the storage device, thereby enabling efficient usage of memory resources and enhancing privacy. In some embodiments, the recorded sensor data (which is not anonymized) is only stored on a local buffer where the recorded sensor data is anonymized (i.e., personal characteristics are removed/ masked), and the anonymized sensor data is then provided as input to the trained statistical model(s) 104.

According to some embodiments, the one or more computer processors of system 100 may be programmed to perform anonymization while training the one or more statistical or inferential models 104 (indicated as stage II in FIG. 1). In these embodiments, the recorded sensor data provided as input to the statistical models includes or otherwise reflects the personal characteristic. In some implementations, an adversarial training approach may be utilized to train the statistical models to anonymize the recorded sensor data while predicting handstate information. The statistical models may output anonymized handstate information that is then used to update the musculoskeletal representation 106. As such, the musculoskeletal representation 106 can be an anonymized musculoskeletal representation from which the personal characteristics have been removed/masked because the musculoskeletal representation 106 is generated based on the anonymized handstate information.

In some implementations, the adversarial training approach for anonymizing recorded sensor data while predicting handstate information includes 1) identifying specific users, and 2) using the mapping from neuromuscular activity to a specific user as input to the adversarial network which concurrently anonymizes the recorded sensor data (e.g., neuromuscular sensor data) and predicts handstate.

In some embodiments, a specific user may be identified based on recorded neuromuscular sensor data (e.g., EMG) by leveraging unique biophysical characteristics of the user. For example, the electrical signature of motor unit action potentials (MUAPs) can be represented as a wavelet (spatiotemporal pattern recorded from one or more neuromuscular sensors) that is characteristic of an individual's particular anatomy (including, for example, the specific size, location, and innervation pattern of motor units; the size of their arm; and the location and amount of adipose tissue). In other embodiments, a specific user may be identified by collecting neuromuscular sensor data from the specific user and a plurality of other users and training an adversarial network (or other appropriate network) to derive characteristic features that uniquely identify neuromuscular data from the user. Subsequently, new neuromuscular data from the user or another individual may be provided to the trained statistical model, which provides a likelihood or confidence level that the neuromuscular data is recorded from the specific user.

An example of how the adversarial training approach may be implemented as follows. The recorded sensor data (including, for example, non-anonymized sensor data collected from multiple individuals together with corresponding ground truth data representing expected model output estimates) may be provided as input to a pre-trained statistical model F. The pre-trained statistical model F receives as input (potentially preprocessed) neuromuscular signals x and generates a handstate prediction F(x). To remove personally identifying information from the neuromuscular signals x while preserving information about the handstate, two models (e.g., neural networks) G and H may be trained. Model G produces modified versions of the signals G(x) based on the neuromuscular signals x. Model H, which is a classifier, makes a prediction H(G(x)) about which user the signals x are recorded from based on the modified signals G(x). The parameters of model H may be optimized to reduce the classification cross-entropy, while the parameters of model G may be optimized to increase the classification cross-entropy while maintaining high accuracy of the handstate predictions F(G(x)).

According to some embodiments, the one or more computer processors of system 100 may be programmed to perform anonymization by processing an output of the trained statistical models 104 (indicated as stage III in FIG. 1). In these embodiments, the predicted handstate information output by the trained statistical models includes or otherwise reflects the personal characteristics of the user. The output of the trained statistical models may be processed to remove these personal characteristics. As such, the musculoskeletal representation 106 is an anonymized musculoskeletal representation from which the personal characteristics have been removed/masked because the musculoskeletal representation 106 is generated based on an output of the statistical model that is processed to remove these personal characteristics.

In some implementations, the processing of the output of the trained statistical model may include averaging the output over time to generate a smoothed output of the trained statistical model. For example, the temporal smoothing may be implemented using a temporal filter that generates a smoothed output of the trained statistical model. In other implementations, the output of the trained statistical model may be mapped to at least one state of a number of discrete states, where each state may represent a generic movement pattern or gesture (that is generic across a population of users). For example, when the output of the trained statistical model (i.e., the predicted handstate information) is indicative of an "open palm" gesture with tremors, the output may be mapped to a generic "open palm" gesture (without the tremors), thereby removing the undesired personal characteristics. In some embodiments, the discrete states may include discrete (e.g., stable gestures) or continuous states (e.g., particular motions).

As used herein, the term "gestures" refers to a static or dynamic configuration of one or more body parts including the position of the one or more body parts and forces associated with the configuration. For example, gestures include discrete gestures, such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards.

According to some embodiments, the one or more computer processors of system 100 may be programmed to perform anonymization during rendering of the visual representation of the hand (indicated as stage IV of FIG. 1). In these embodiments, the output of the trained statistical models (e.g., the predicted handstate information) may include or otherwise reflect the personal characteristics of the user. However, these personal characteristics can be removed/masked during rendering of the visual representation when they disclosed private or health related information of a user (e.g., a neurological condition suffered by an assembly line operator).

In some embodiments, the visual representation of the hand may be altered to remove or mask one or more physical characteristics or attributes of the user. For example, a dimension of one or more fingers of the hand may be altered during rendering of the visual representation of the hand. In other embodiments, some personal characteristics may be removed/masked by mapping the visual representation to at least one state of a number of discrete states, where each state represents a generic visual representation of the hand (that is generic across a population of users).

In some embodiments, various user interface controls may be provided via the user interface that enable the user to selectively share, provide, or otherwise render anonymized or non-anonymized visual representations of a part of the user's body (e.g., hand). For example, a toggle control may be provided that allows the user to select between whether the user desires to share an anonymized rendering or not with another user, group of users, or category of users (e.g., a physician).

In some embodiments, different types of personal characteristics for the same user may be removed at different stages of the pipeline. For example, the user may have a curved finger and may suffer from tremors in the hand. In such a case, a first type of personal characteristic (e.g., tremors) may be removed at stage I and a second type of personal characteristic (e.g., curved finger) may be masked at stage IV. It will be appreciated that the examples provided herein are non-limiting, and the user's personal characteristics may be removed/masked at any one or a combination of stages.

According to some embodiments, system 100 may include a plurality of processors configured to communicate via a network. In such embodiments, anonymization of sensor data may be performed prior to transmission of the data over the network. The inventors have discovered that it may be advantageous to anonymize sensor data prior to transmission of the data over a network to minimize risks associated with the user's identify being exposed due, for example, to eavesdropping on the transmission. In addition, when data is transmitted from a first processor to a second processor, it may be beneficial to perform anonymization on the sensor data prior to the transfer when the second processor employs lower security measures than the first processor.

The inventors have discovered that a user may want to have a particular personalization for a particular task. In some implementations, the one or more computer processors may be further programmed to re-personalize the musculoskeletal representation by re-applying a particular desired personal characteristic to a musculoskeletal representation that has been anonymized using one or more of the techniques described herein.

Figure 2:
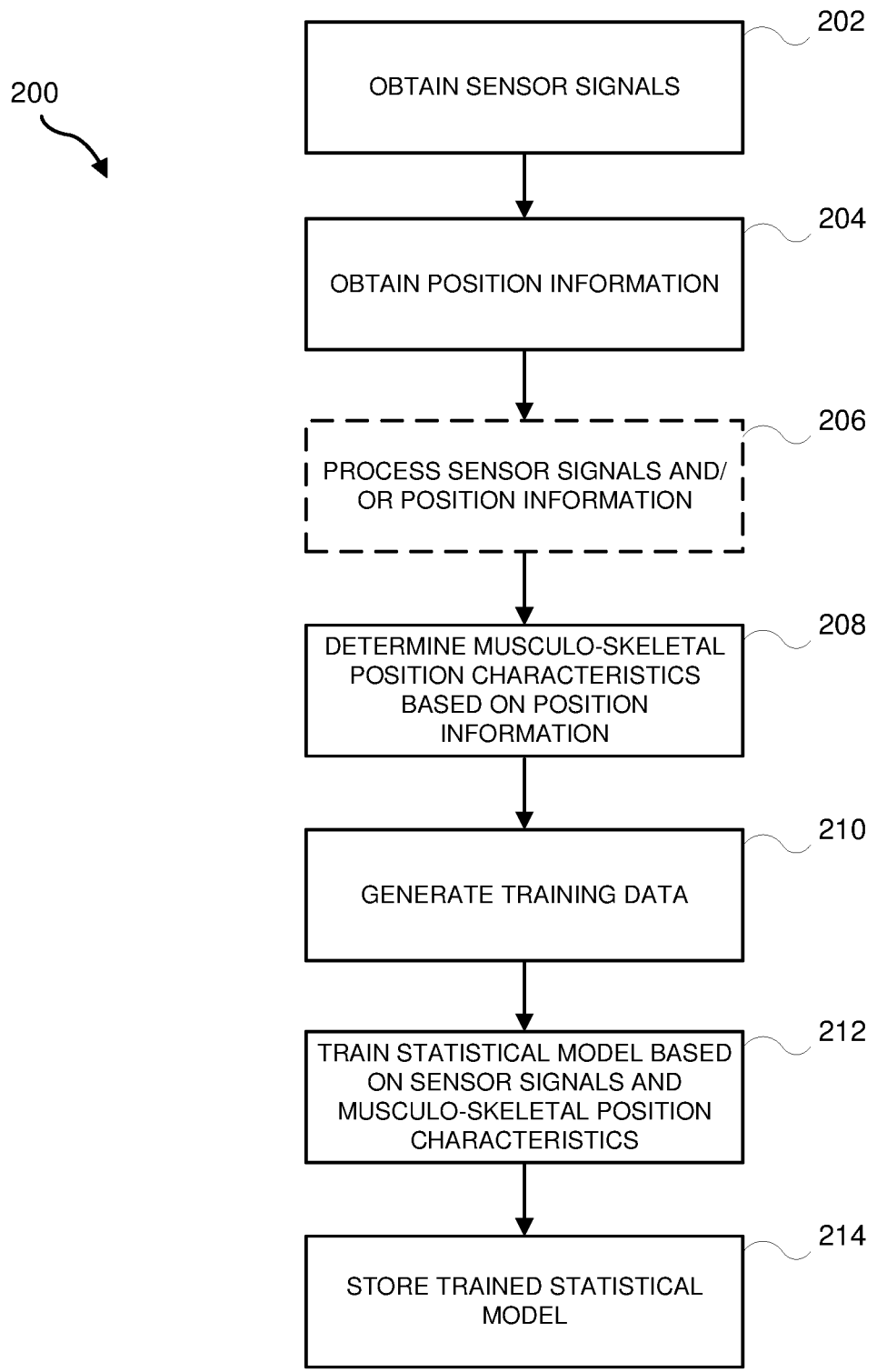
FIG. 2 is a flowchart of a process for generating a statistical model for predicting musculoskeletal position information using signals recorded from sensors, in accordance with some embodiments of the technology described herein.

FIG. 2 describes a process 200 for generating (sometimes termed "training" herein) a statistical or inferential model using signals collected or recorded from sensors 102. Process 200 may be executed by any suitable computing device(s), as aspects of the technology described herein are not limited in this respect. For example, process 200 may be executed by one or more computer processors described with reference to FIGS. 1, 4A and 4B. As another example, one or more acts of process 200 may be executed using one or more servers (e.g., servers included as a part of a cloud computing environment). For example, at least a portion of act 210 relating to training of a statistical model (e.g., a neural network) may be performed using a cloud computing environment.

Process 200 begins at act 202, where a plurality of sensor signals are obtained for one or multiple users performing one or more movements (e.g., typing on a keyboard). In some embodiments, the plurality of sensor signals may be recorded as part of process 200. In other embodiments, the plurality of sensor signals may have been recorded prior to the performance of process 200 and are accessed (rather than recorded) at act 202.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more optional IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more optional IMU sensors arranged to predict the joint angle of the user's leg relative to the user's torso.

In some embodiments, the sensor signals obtained in act 202 correspond to signals from one type of sensor (e.g., one or more IMU sensors or one or more neuromuscular sensors) and a statistical or inferential model may be trained based on the sensor signals recorded using the particular type of sensor, resulting in a sensor-type specific trained statistical model. For example, the obtained sensor signals may comprise a plurality of EMG sensor signals arranged around the lower arm or wrist of a user and the statistical model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical or inferential model may be trained for each of the types of sensors and the outputs of the sensor-type specific models may be combined to generate a musculoskeletal representation of the user's body. In other embodiments, the sensor signals obtained in act 202 from two or more different types of sensors may be provided to a single statistical or inferential model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 202 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \leq k \leq K\}$ at time points $t_1, t_2, \ldots, t_k$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate a statistical model that can accurately predict musculoskeletal position information associated with performance of the task.

In some embodiments, a user-independent statistical model may be generated based on training data corresponding to the collected or recorded signals from multiple users, and as the system is used by a user, the statistical or inferential model is trained based on collected or recorded sensor data such that the statistical or inferential model learns the user-dependent characteristics to refine the prediction capabilities of the system for the particular user. User-dependent training may include a variety of different motor or neuromuscular tasks and may include supervised learning techniques. For example, one or more of the systems described herein may instruct an operator to perform one of a variety of standardized movements (e.g., a standardized finger pinch gesture, a standardized finger tap gesture) and may record neuromuscular (e.g., EMG) data. The systems may label the neuromuscular data corresponding to the various gestures and use that additional data to fine-tune statistical models for the user's movement.

In some embodiments, the plurality of sensor signals may include signals (e.g., neuromuscular signals) collected recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing one or more inferential or statistical models for predicting musculoskeletal position information associated with multiple different actions that may be taken by a user. For example, training data that incorporates musculoskeletal position information for multiple actions may facilitate generating a statistical or inferential model for predicting which of multiple possible movements a user may be performing. In certain embodiments, an individual or one or more users can be prompted or unprompted (e.g., via supervised or unsupervised learning techniques) to perform one or more motor tasks or sub-tasks within an overall larger task. If prompted, the users can be instructed by any appropriate means (e.g., visual or auditory or haptic means) to perform the tasks or sub-tasks. Neuromuscular data (e.g., EMG data) can be collected and processed while the users are repeatedly performing the instructed tasks over a defined period of time. This neuromuscular data can be analyzed and labeled to correspond to specific tasks or sub-tasks of the various users. Certain patterns or parameters from the neuromuscular data can be extracted (e.g., temporal, spatial, and/or temporospatial parameters of the EMG waveforms) for each of the tasks or sub-tasks. In this way, the system can associate one or more neuromuscular patterns or parameters with each of the tasks or sub-tasks and can label those patterns accordingly. These acceptable patterns or parameters of neuromuscular data can be regarded as metrics for performance of the tasks(s).

As discussed above, the sensor data obtained at act 202 may be obtained by collecting or recording sensor signals as each of one or multiple users performs each of one or more tasks one or more multiple times. As the user(s) perform the task(s), position information describing the spatial position of different body segments during performance of the task(s) may be obtained in act 204. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object, tightening a screw, assembling an specific part or other suitable assembly or manufacturing related tasks. The sensor data obtained at act 202 may be recorded simultaneously with recording of the position information obtained in act 804. In this example, position information indicating the position of each finger segment over time as the grasping motion is performed is obtained.

Next, process 200 proceeds to act 206, where the sensor signals obtained in act 202 and/or the position information obtained in act 204 are optionally processed. For example, the sensor signals or the position information signals may be processed using amplification, filtering, rectification, or other types of signal processing.

Next, process 200 proceeds to act 208, where musculoskeletal position characteristics are determined based on the position information (as collected in act 204 or as processed in act 206). In some embodiments, rather than using recorded spatial (e.g., x, y, z) coordinates corresponding to the position sensors as training data to train the statistical model, a set of derived musculoskeletal position characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 204 may be represented by a vector of n joint angles at each of a plurality of time points, where n is the number of joints or connections between segments in the articulated rigid body model.

Next, process 200 proceeds to act 210, where the time series information obtained at acts 202 and 208 is combined to create training data used for training a statistical model at act 210. The obtained data may be combined in any suitable way. In some embodiments, each of the sensor signals obtained at act 202 may be associated with a task or movement within a task corresponding to the musculoskeletal position characteristics (e.g., joint angles) determined based on the positional information recorded in act 204 as the user performed the task or movement. In this way, the sensor signals may be associated with musculoskeletal position characteristics (e.g., joint angles) and the statistical model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 200 proceeds to act 212, where a statistical or inference model for predicting musculoskeletal position information is trained using the training data generated at act 210. The model being trained may take as input a sequence of data sets each of the data sets in the sequence comprising an n-dimensional vector of sensor data. The model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the model may take as input a sequence of vectors $\{x_k | 1 \leq k \leq K\}$ generated using measurements obtained at time points ti, ti, ..., tK, where the ith component of vector Xj is a value measured by the ith sensor at time tj and/or derived from the value measured by the ith sensor at time tj. In another non-limiting example, a derived value provided as input to the statistical model may comprise features extracted from the data from all or a subset of the sensors at and/or prior to time tj (e.g., a covariance matrix, a power spectrum, a combination thereof, or any other suitable derived representation). Based on such input, the model may provide output indicating, a probability that a musculoskeletal representation of the user's body will be characterized by a set of musculoskeletal position characteristics. As one non-limiting example, the model may be trained to predict a set of joint angles for segments in the fingers in the hand over time as a user grasps an object. In this example, the trained model may output, a set of predicted joint angles for joints in the hand corresponding to the sensor input.

In some embodiments, the statistical model, inferential model, the machine learning model or a combination of the foregoing models include a neural network, for example, a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model and/or machine learning model includes a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of inferential or statistical machine learning models may be employed in some embodiments. For example, in some embodiments, the inferential or statistical models may comprise a hidden Markov model, a Markov switching model with the switching allowing for toggling among different dynamic systems, dynamic Bayesian networks, and/or any other suitable graphical model having a temporal component. Any such statistical model may be trained at act 212 using the sensor data obtained at act 202.

As another example, in some embodiments, the inferential or statistical model(s) may take as input, features derived from the sensor data obtained at act 202. In such embodiments, the models may be trained at act 212 using features extracted from the sensor data obtained at act 202. The machine learning models may comprise a support vector machine, a Gaussian mixture model, a regression-based classifier, a decision tree classifier, a Bayesian classifier, and/or any other suitable classifier, as aspects of the technology described herein are not limited in this respect. Input features to be provided as training data to the statistical model may be derived from the sensor data obtained at act 202 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 212, values for parameters of the statistical or inferential model may be estimated from the training data generated at act 210. For example, when the machine learning model is a neural network, parameters of the neural network (e.g., weights) may be estimated from the training data. In some embodiments, parameters of the model(s) may be estimated using gradient descent, stochastic gradient descent, and/or any other suitable iterative optimization technique. In embodiments where the one or more models comprise a recurrent neural network (e.g., an LSTM), the model may be trained using stochastic gradient descent and backpropagation through time. The training may employ a cross-entropy loss function and/or any other suitable loss function, as aspects of the technology described herein are not limited in this respect.

Next, process 200 proceeds to act 214, where the trained model is stored (e.g., in a datastore—not shown). The trained model may be stored using any suitable format, as aspects of the technology described herein are not limited in this respect. In this way, the model generated during execution of process 200 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to a statistical or inferential model trained using one or more techniques described above in connection with FIG. 2. In some embodiments that continuously record autonomous signals, the continuously recorded signals (raw or processed) may be continuously or periodically provided as input(s) to the trained model(s) for prediction of musculoskeletal position information (e.g., joint angles) for the given set of input sensor data. As discussed above, in some embodiments, the trained models can comprise a user-independent model trained based on autonomous sensor and position information measurements from a plurality of users. In other embodiments, the trained model(s) can comprise a user-dependent model trained on data recorded from the individual user from which the data associated with the sensor signals is also acquired.

After the trained model receives the sensor data as a set of input parameters, the predicted musculoskeletal position information is output from the trained statistical model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained statistical model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the statistical model to provide new predictions of the musculoskeletal position information (e.g., an updated set of joint angles), the computer-based musculoskeletal representation of the user's body may be updated based on the updated set of joint angles determined based on the output of the statistical model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically posed skeleton. In some embodiments, muscle activity sensed by neuromuscular sensors and/or information derived from the muscle activity (e.g., force information) may be combined with the computer-generated musculoskeletal representation in real time.

Figure 3A:
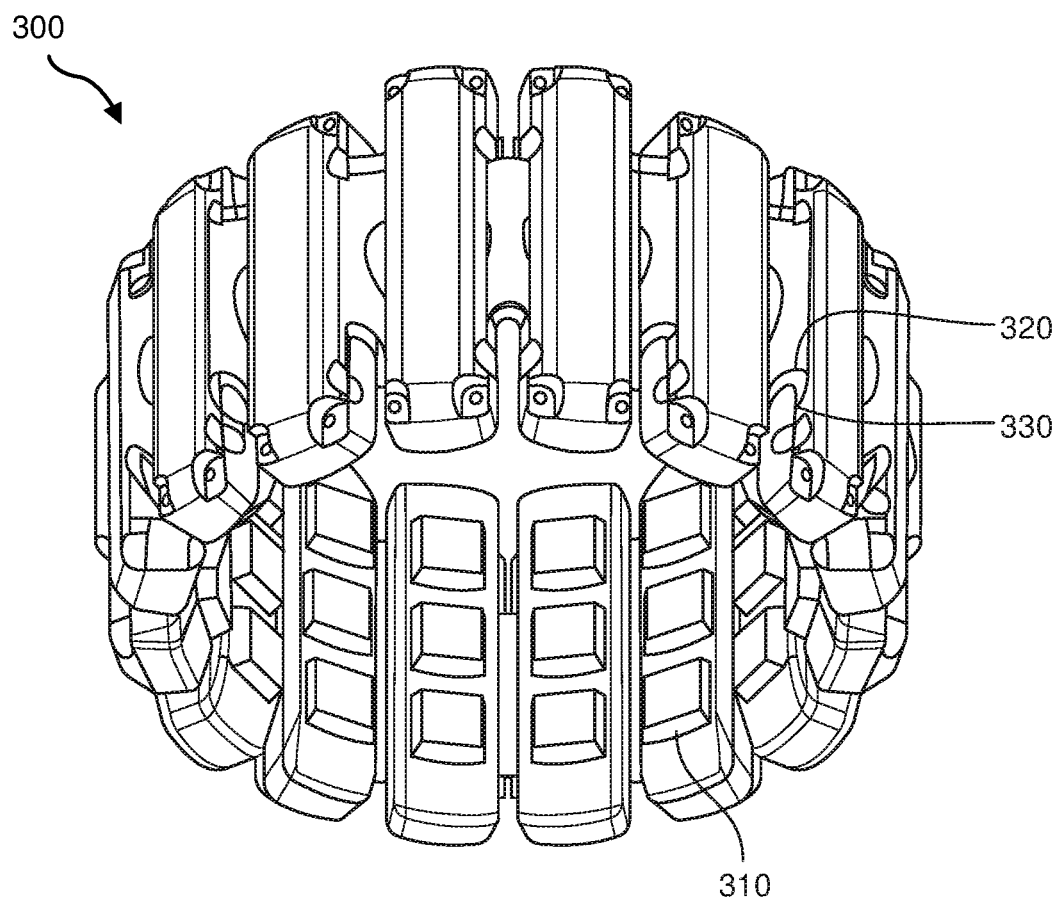
FIG. 3A illustrates a wearable system with sixteen EMG sensors arranged circumferentially around an elastic band configured to be worn around a user's lower arm or wrist, in accordance with some embodiments of the technology described herein.

FIG. 3A illustrates a wearable system 300 with sixteen neuromuscular sensors 310 (e.g., EMG sensors) arranged circumferentially around an elastic band 320 configured to be worn around a user's lower arm or wrist. As shown, EMG sensors 310 are arranged circumferentially around elastic band 320. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

Figure 3B:
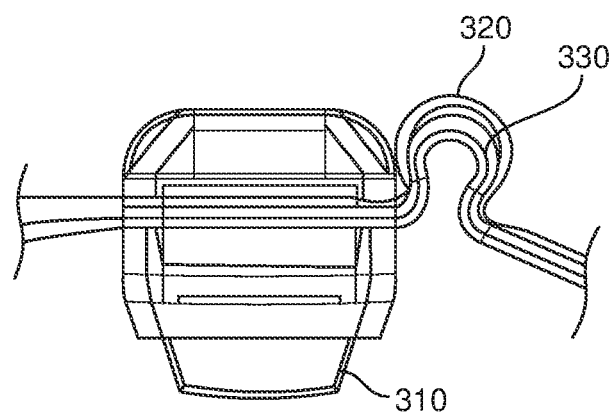
FIG. 3B is a cross-sectional view through one of the sixteen EMG sensors illustrated in FIG. 3A.

In some embodiments, sensors 310 include a set of neuromuscular sensors (e.g., EMG sensors). In other embodiments, sensors 310 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation-based sensors for use with a radiation-generation device (e.g., a laser-scanning device), or other types of sensors such as a heart-rate monitor. As shown the sensors 310 may be coupled together using flexible electronics 330 incorporated into the wearable device. FIG. 3B illustrates a cross-sectional view through one of the sensors 310 of the wearable device shown in FIG. 3A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 310 are discussed in more detail below with reference to FIGS. 4A and 4B.

In some embodiments, a training dataset can be collected from one or more trained assembly line operators during performance of an assembly line task. The training dataset may comprise one or more data types related to the movements and forces of the trained operator, including EMG data (i.e. collected via the armband system discussed with reference to FIGS. 3A and 3B) and auxiliary data. Auxiliary data may include movement tracking data (i.e. from a camera-based system), data from an IMU sensor attached to the operator, and/or data from other auxiliary sensors as described above. An assembly line operator may be categorized as an expert from whom a training dataset is captured based on their previous dexterity, accuracy, economy of movement, speed, throughput, ergonomic posture, or other suitable metric with respect to tasks performed on an assembly line or other manufacturing environment. The data selected to be part of the training dataset is data that provides insight about movements and forces performed by a human operator that leads to an efficient and/or accurate assembly of a product in compliance with product specifications and quality standards. The produced training dataset can then be used to train statistical or inference models, for example, the models discussed at 212 with respect to FIG. 2. In some instances, the models can then be used by an augmented reality system and a virtual reality system as discussed below.

In some embodiments, assembly line operators can be equipped with the armband system and a set of smart glasses or other system for implementing an augmented reality environment. The augmented reality system can be configured to support assembly line operators in the execution of manufacturing tasks (also referred herein as a supported manufacturing task). For instance, visual prompts can be displayed to the operator via the smart glasses based on signals received from a wearable (e.g. armband) system for neuromuscular recording, images captured through the smart glasses, or outputs generated by trained statistical or inference models, ensuring that the operator properly executes a manufacturing task. Thus, in some implementations, the armband system used in conjunction with the augmented reality system as described below, can increase product quality, reducing the number of products returned or removed from the assembly line due to defects or quality issues.

In some embodiments, the augmented reality system can implement an image recognition model (e.g., a convolutional neural network) trained to recognize a product at different assembly stages. Thus, depending on the identified product and its assembly stage, the augmented reality system can instruct the operator to perform a supported manufacturing task. The instructions can include graphical prompts illustrating the operator's position for the execution of the manufacturing task (e.g., position with respect to the product) along with other requirements for the execution of the manufacturing task e.g., assembly steps.

In some instances, a supported manufacturing task can include a target force applied between two parts by a tool used by the operator (e.g. screwing two parts of a product together to within a target range of force). In such a case, based on EMG signals collected from the operator, the armband system can compute an estimated force value applied by the assembly line operator through a tool while screwing the two pieces together. The armband system can subsequently send a signal indicative of the estimated force value to the smart glasses which may cause the augmented reality system to display a visual prompt to the assembly line operator indicating that the two pieces need to be further tightened (e.g., insufficient force applied warning) or that the two parts are coupled with an acceptable amount of force. The determination of whether an applied force is insufficient or acceptable can be made by one or more sensors that measure neuromuscular activity of the operator (e.g. via an armband sensor array as described herein) and, optionally, one or more auxiliary sensors and provided as input to the trained statistical or inferential model from which feedback to the operator may be delivered via an augmented reality system. In some embodiments, the armband neuromuscular recording (i.e. EMG) system may compare an estimated force value with a predetermined threshold force value. The predetermined threshold value represents a logical boundary between an acceptable force and an insufficient force applied by the operator to a part (either directly with their hand or via a tool). In another exemplary embodiment, a generalized inferential model trained on multiple user data can be applied to identify any deviation from the expected neuromuscular signals or patterns as applied during another individual's performance of the task or sub-task. For example, if the desired motor task is applying 5 lbs of torque to a screwdriver, a generalized learning model can be generated based on several or a large amount of users who appropriately perform the motor task within an acceptable amount of range in the force being applied. For a new user training to perform the same screwdriver task, the systems and methods disclosed herein can be used to detect a deviation from the expected neuromuscular patterns as detected from the broader population and alert a supervisor and/or the operator in real-time. In this way, potential quality issues or defects can be detected during or right after assembly of a component or part. In another embodiment, deviations within a pool of users can be identified. For example, certain ranges of neuromuscular data parameters associated with certain tasks or sub-tasks can be identified in advance of or during performance of the tasks. If a user within the pool generates neuromuscular signals that fall outside of the parameters identified, the system would be able to detect and alert for a perceived deviation from the expected neuromuscular patterns, parameters, or metrics.

The system may be further configured to acquire training data by measuring the actual force applied between the two parts in addition to movement and force data measured from an armband neuromuscular system as described herein and, optionally, one or more auxiliary sensors. Thus, as described herein, a statistical or machine learning model may be trained to associate the forces applied by an operator's arm with the force applied between two parts and thereby guide an operator through an augmented reality or other feedback system (e.g. haptic, auditory, visual) to apply an appropriate amount of force through a tool applied to a part. In some instances, when the feedback includes visual feedback, the feedback may be in the form of augmented reality, virtual reality, or another form not based on augmented or virtual reality for instance, visual feedback provided on a display, holograms, or another suitable type of visual feedback.

In some other instances, the movements of an operator's hand and arm may be tracked for both relative (e.g. pitch, yaw, and roll of the hand) and absolute (e.g. x, y, z) position (i.e. with six degrees of freedom). In such a case, the armband system can monitor movements made by an assembly line operator, enabling the computation of six degrees of freedom measurements while ensuring that the movements required for assembly are properly performed. For instance, the armband system can determine whether an assembly line operator properly mounted a part. Mounting such a part may require pushing the part forward (translation along a forward/backward axis) to be inserted in a slot or opening on the product being assembled, moving the part to the right (translation along a left/right axis) e.g., along a first groove, and then, moving the part down (translation along an up/down axis) e.g., along a second groove causing a strike or keeper hook to be inserted into a grab or cam, thus effectively locking a grabber catch latch. In such a case, the armband system can compute distance measurements across six degrees of freedom, ensuring that the movements required to assemble the product (i.e., pushing the part forward, moving the part to the right, and moving the part down) are executed by the operator. Accordingly, if the operator pushes the part forward into the slot but does not execute the next subsequent movements (i.e., moving right, and moving down) then the armband system can send a notification signal to the smart glasses to cause the augmented reality system to display a notification message to the operator communicating that the task was not completed.

In yet some other instances, the armband system can monitor, for example, the angle at which an assembly line operator is positioned with respect to a part being assembled through a camera-based system (or other system for identifying objects and tracking them in space) by automatically recognizing both the part and a part of the body of the operator. The armband system can then send a signal to the smart glasses to cause the augmented reality system to display a warning message when the armband system has determined that the operator is holding a suboptimal posture. A suboptimal posture can be defined as a posture held by an operator during the assembly of a part or product that is known to be prone to cause an injury to the operator, cause the product or a part of the product to break, result in a slow assembly pace, or cause or result in another condition detrimental to efficient and high-quality manufacturing. In some implementations, the actual posture of an assembly line operator can be determined based on signals received from the armband system, images collected from the smart glasses, or other sensors placed in proximity to the operator (e.g., video cameras, laser scanning systems, or other suitable sensors).

The type of six degrees of freedom measurements computed by the armband system and auxiliary sensors may vary depending on the movements and posture required for the operator to assemble a product. For example, as discussed above, in some instances, the six degrees of freedom measurements computed via the armband system can indicate distance traversed by the assembly line operator's hands. Likewise, the six degrees of freedom measurements can include rotation measurements about three perpendicular axes e.g., normal axis, transverse axis, and longitudinal axes. For example, rotation measurements can be computed in addition to the applied force to assess the form employed by an operator while, for example, screwing two parts of a product together (as discussed above) or at the time of executing other suitable manufacturing task.

In some embodiments, the performance of assembly line operators can be monitored in real-time or near real-time using the armband system. For instance, performance metrics collected from a set of assembly line operators at times when such operators are wearing the armband system while executing manufacturing tasks in the assembly line can be displayed via an interface implemented at a monitoring and alert station. Supervisors or other interested users can access the interface (e.g., a graphical user interface) to observe the performance state of the operators at a given time. In some instances, the monitoring and alert system can send warning messages (e.g., via email or phone text messages) or display a warning indicator at a graphical user interface to inform supervisors about performance anomalies. For instance, the monitoring and alert system can display or send a warning message when an operator is performing in an erratic manner (based on the tracking of movements) or showing fatigue symptoms as discussed above determined based on collected EMG signals. Thus, supervisors can proactively take measures to prevent operator injury and/or assembly errors.

In some embodiments, a training system can be implemented to prepare assembly line operators or trainees to perform new or complex manufacturing tasks. The training system can include the armband system, and an augmented or virtual reality system. The armband system can be used to capture trainees' performance metrics not apparent or clear to human trainers and trainees. For instance, trainer personnel may have trouble observing the amount of force applied by a trainee at the time of performing a manufacturing task. Likewise, trainer personnel may have trouble gauging the economy of movements performed by trainees. In some implementations, the training system can generate accurate and objective feedback based on one or more performance metric values to provide an overall assessment of the trainee (e.g., an overall score).

As discussed above, in some embodiments, the training system can include a display or a pair of smart glasses that implement an augmented or virtual reality system. In such cases, parts of a trainee body (e.g., arm, hand, or other suitable body part) can be projected onto the virtual or augmented reality environment along with prompts indicating, for instance, an amount of force currently applied by a trainee at a given time, a suggested path to follow for replicating the most economic set of movements to perform a predetermined manufacturing task, or other suitable prompts. In some instances, the training system can display (e.g., via the smart glasses or other display) aiding prompts with respect to a current task, and additionally, display an identifier of subsequent tasks (e.g., an image located on a screen or display corner) that need to be performed in a sequence of tasks required to properly assembly a product.

In certain exemplary embodiments, one or more inferential models can be trained specifically for a given user based on their repeated performance of a task. The metrics collected during this performance can be later used to measure subsequent performance of that same user after a given period of time during which the user has not performed the same task. In this way, any loss of muscle memory or degradations or deviation in performance can be measured. In another embodiment, the collected and processed neuromuscular data can be used to inform process engineering or design changes. For example, if a deviation from the expected pattern of neuromuscular signals is detected at a specific frequency across one or more operators, then a change in the design process or engineering process can be implemented to reduce operator error while still producing an appropriate output for the motor task at hand. For such exemplary embodiments, task or sub-task related metrics can be utilized for an individual operator over their repeated performance of the task or sub-task, or broader metrics can be utilized based on multiple operators performing the task repeatedly and comparing those metrics to those obtained from an individual operator. As discussed, it should be understood that other collected and processed data in addition to neuromuscular data can be used to better train one or more statistical or inferential learning models. For example, such a sensor fusion scenario can include images captured from a mounted camera during performance of a visually perceptible hand assembly task that can be used to train one or more inferential models to more accurately identify patterns of neuromuscular data (e.g., those associated with visually perceptible hand movements). In this way, the captured images can act as "ground-truth" for certain perceptible movements, or this data can be used to augment the collected neuromuscular data, and together the additional information can be used to more accurately label the neuromuscular data corresponding to the movements.

In another exemplary embodiment, the systems and methods disclosed herein can be applied to surgical or medical use cases. In such an embodiment, it may be difficult to score performance of the task or sub-task during its performance. Instead, the result of the task or sub-task may be best accurately assessed after it is performed. For example, there may not necessarily be specific metrics associated with suturing or applying stitches to a patient, but the final outcome of the suturing or stitching process can be assessed upon completion by a medical professional. If the final outcome of the suturing or stitching process is deemed to be medically acceptable, then the collected and processed neuromuscular signals during the procedure can be labeled "after-the-fact" as corresponding to acceptable amounts of force being applied by the doctor during the procedure. If the final outcome is deemed to be medically unacceptable, then collected and processed neuromuscular signals during the procedure can be labeled "after-the-fact" as corresponding to an unacceptable amount of force being applied. In either case, the processed and analyzed neuromuscular signals can be used to later inform subsequent medical professionals performing the same motor tasks or sub-tasks in real-time. For example, if certain patterns or parameters of neuromuscular signals were detected during a procedure that was deemed to be medically unacceptable, then the subsequent detection of such patterns or parameters can be used to alert the operator in real-time during the procedure so that they can correct their approach.

In another exemplary embodiment, a third-party can remotely supervise the performance of a task or sub-task. For example, in a military application such as drone piloting, a supervisor can be located remotely from the operator. Using the same systems, methods, and techniques as described herein, a remote supervisor would be able to detect poor steering performance by an individual operator of a drone system and provide real-time feedback to the operator to correct their steering approach. Other remote examples with military applications include pilot simulations, construction of military equipment, operating or cleaning weaponry, etc.

FIGS. 4A and 4B illustrate a schematic diagram with internal components of a wearable system with sixteen EMG sensors, in accordance with some embodiments of the technology described herein. As shown, the wearable system includes a wearable portion 410 (FIG. 4A) and a dongle portion 420 (FIG. 4B) in communication with the wearable portion 410 (e.g., via Bluetooth or another suitable short-range wireless communication technology). As shown in FIG. 4A, the wearable portion 410 includes the sensors 310, examples of which are described in connection with FIGS. 4A and 4B. The output of the sensors 310 is provided to analog front end 430 configured to perform analog processing (e.g., noise reduction, filtering, etc.) on the recorded signals. The processed analog signals are then provided to analog-to-digital converter 432, which converts the analog signals to digital signals that can be processed by one or more computer processors. An example of a computer processor that may be used in accordance with some embodiments is microcontroller (MCU) 434 illustrated in FIG. 4A. As shown, MCU 434 may also include inputs from other sensors (e.g., IMU sensor 440), and power and battery module 442. The output of the processing performed by MCU may be provided to antenna 450 for transmission to dongle portion 420 shown in FIG. 4B.

Dongle portion 420 includes antenna 452 configured to communicate with antenna 450 included as part of wearable portion 410. Communication between antenna 450 and 452 may occur using any suitable wireless technology and protocol, non-limiting examples of which include radiofrequency signaling and Bluetooth. As shown, the signals received by antenna 452 of dongle portion 420 may be provided to a host computer for further processing, display, and/or for effecting control of a particular physical or virtual object or objects.

Figure 5:
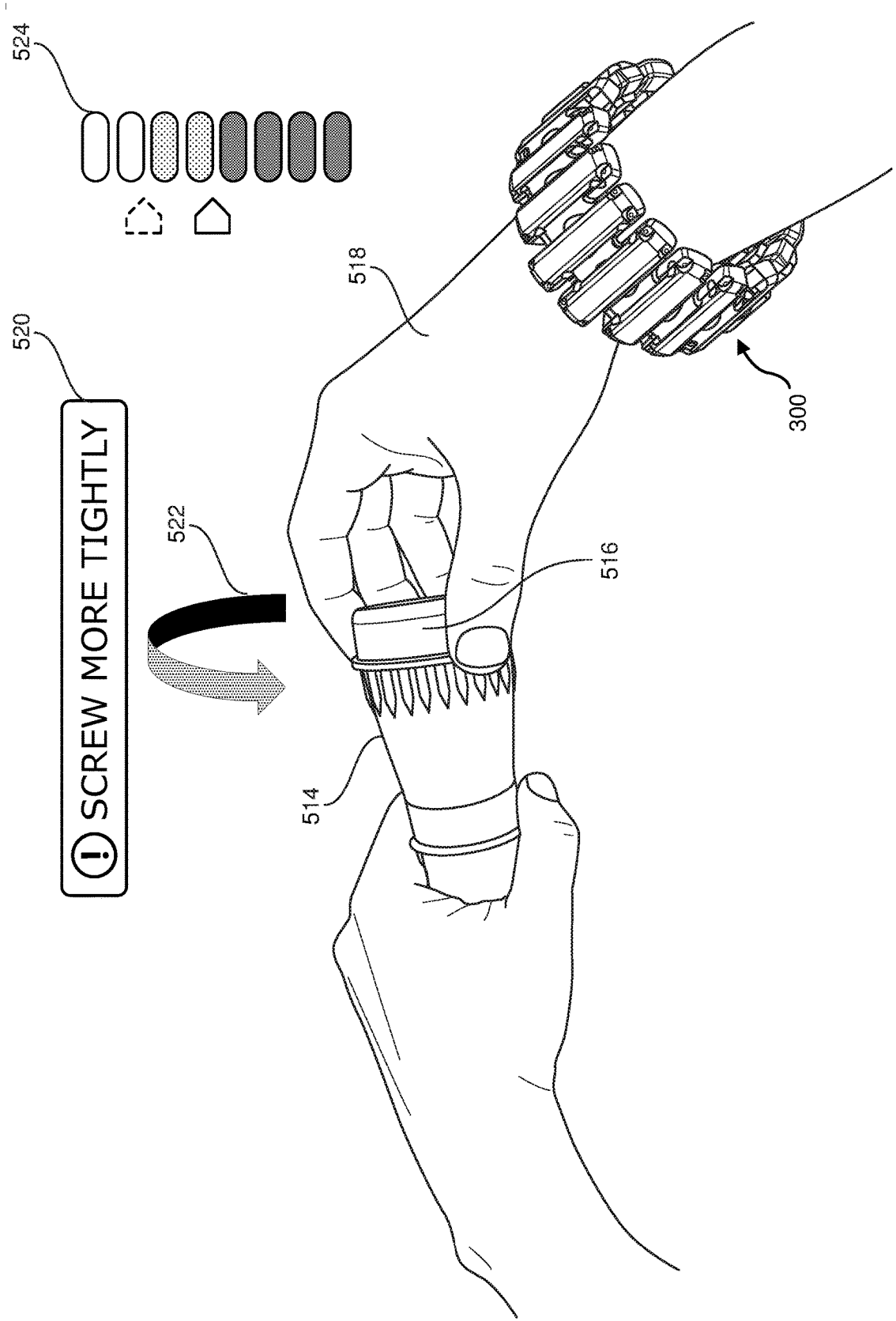
FIG. 5 illustrates an example augmented view of an example manufacturing task.

FIG. 5 illustrates an example augmented view of an example manufacturing task supported by one of more of the systems described herein. As shown in FIG. 5, the supported manufacturing task may include a target force applied by the operator to screw to parts of a product together (e.g., a part 514 and a part 516) within a target range of force. The operator may wear the wearable system 300, providing information about the handstate of hand 518 of the operator. Wearable system 300 may collect EMG signals from the operator and compute an estimated force value applied by the operator while screwing part 516 onto part 514. Wearable system 300 may subsequently send a signal indicative of the estimated force value to an augmented reality system (e.g., smart glasses) which may cause the augmented reality system to display a visual prompt 520 to the operator indicating that the two pieces need to be further tightened, a visual prompt 522 providing visual directions to the operator, and/or a gauge 524 indicating the estimated force value and the required force. In some examples, once the two parts are coupled with an acceptable amount of force, the augmented reality system may provide a visual indication to the operator communicating such. The determination of whether an applied force is insufficient or acceptable can be made by one or more sensors that measure neuromuscular activity of the operator (e.g. via wearable system 300) and, optionally, one or more auxiliary sensors and provided as input to the trained statistical or inferential model from which feedback to the operator may be delivered via an augmented reality system. In some embodiments, the neuromuscular recording (e.g., EMG) system may compare an estimated force value with a predetermined threshold force value. The predetermined threshold value represents a logical boundary between an acceptable force and an insufficient force applied by the operator to a part (either directly with their hand or via a tool).

Figure 6:
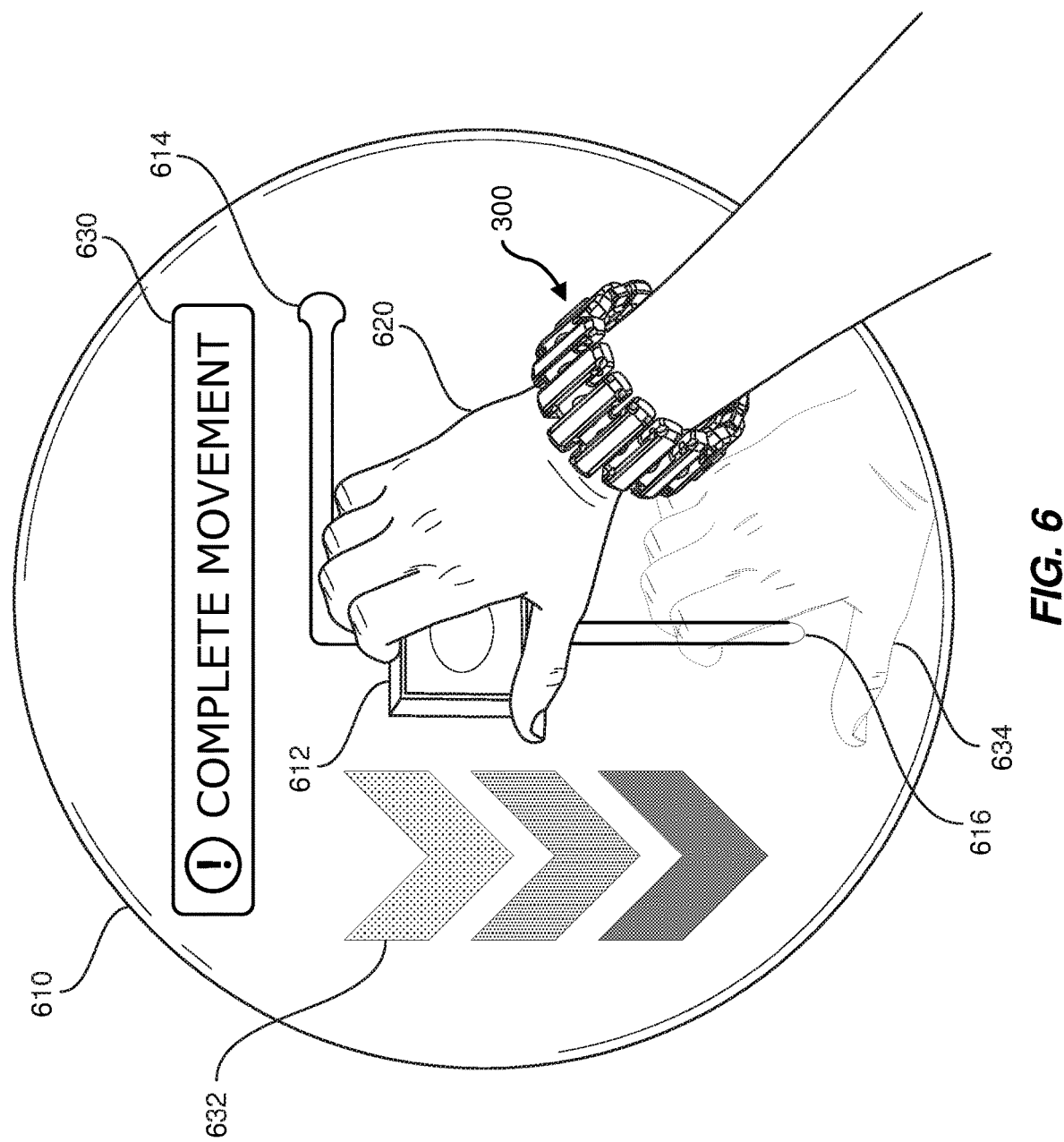
FIG. 6 illustrates another example augmented view of another example manufacturing task.

FIG. 6 illustrates another example augmented view provided to an operator during another example manufacturing task. As shown in FIG. 6, the movements of an operator's hand and arm may be tracked with wearable device 300 and/or other devices described herein for both relative and absolute position along multiple axes (e.g., with six degrees of freedom). In such a case, wearable device 300 can monitor movements made by an assembly line operator, enabling the computation of six degrees of freedom measurements while ensuring that the movements required for assembly are properly performed. For instance, the wearable device 300 can determine whether an operator has properly mounted a part 612 onto a part 610. Mounting part 612 may involve inserting an element of part 612 into an opening 614, pushing part 612 laterally along a groove, then pushing part 612 down along the groove to a terminus 616 of the groove (e.g., causing a strike or keeper hook to be inserted into a grab or cam, thus effectively locking a grabber catch latch). In such a case, wearable device 300 may compute distance measurements across six degrees of freedom, ensuring that the movements required to assemble the product (e.g., inserting part into opening 614, moving part 612 to the left, moving part 612 down to terminus 616, and pushing part 612 with sufficient force to securely engage with part 610 at terminus 616) are executed by the operator. Accordingly, if the operator pushes part 612 left but does not fully execute the next subsequent movements (e.g., moving part 612 fully down to terminus 616), wearable device 300 may send one or more signals to an augmented reality display (e.g., smart glasses) to cause the augmented reality system to display one or more notifications and/or instructions to the operator. For example, the augmented reality system may display an instruction 630 to the operator. Additionally or alternatively, the augmented reality system may display a visual direction 632 to the operator. In at least one example, the augmented reality system may display a visual representation 634 of the operator's hand 620 indicating where the operator should move hand 620 to complete the manufacturing task.

Figure 7:
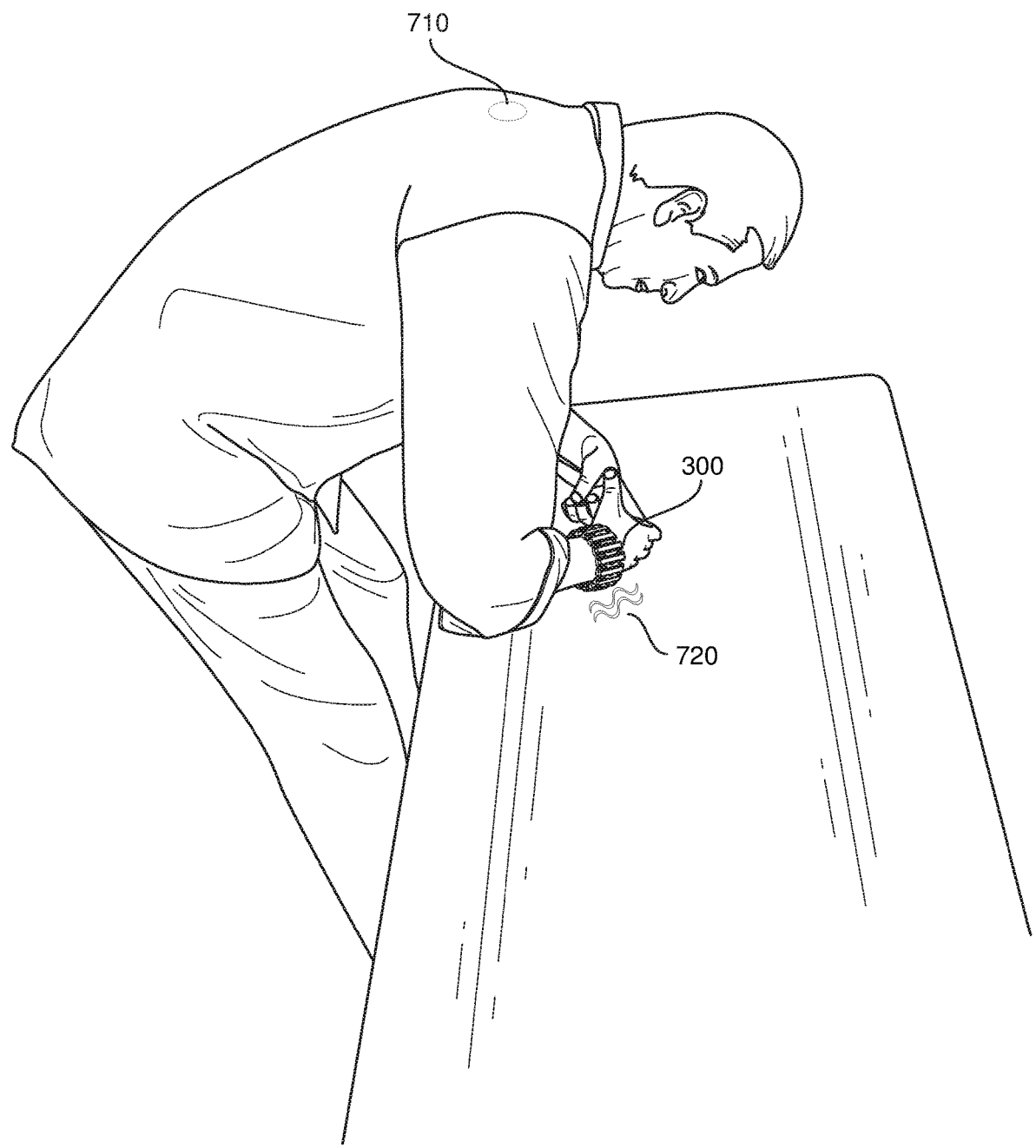
FIG. 7 illustrates feedback provided by a wearable device during an example manufacturing task.
Figure 8:
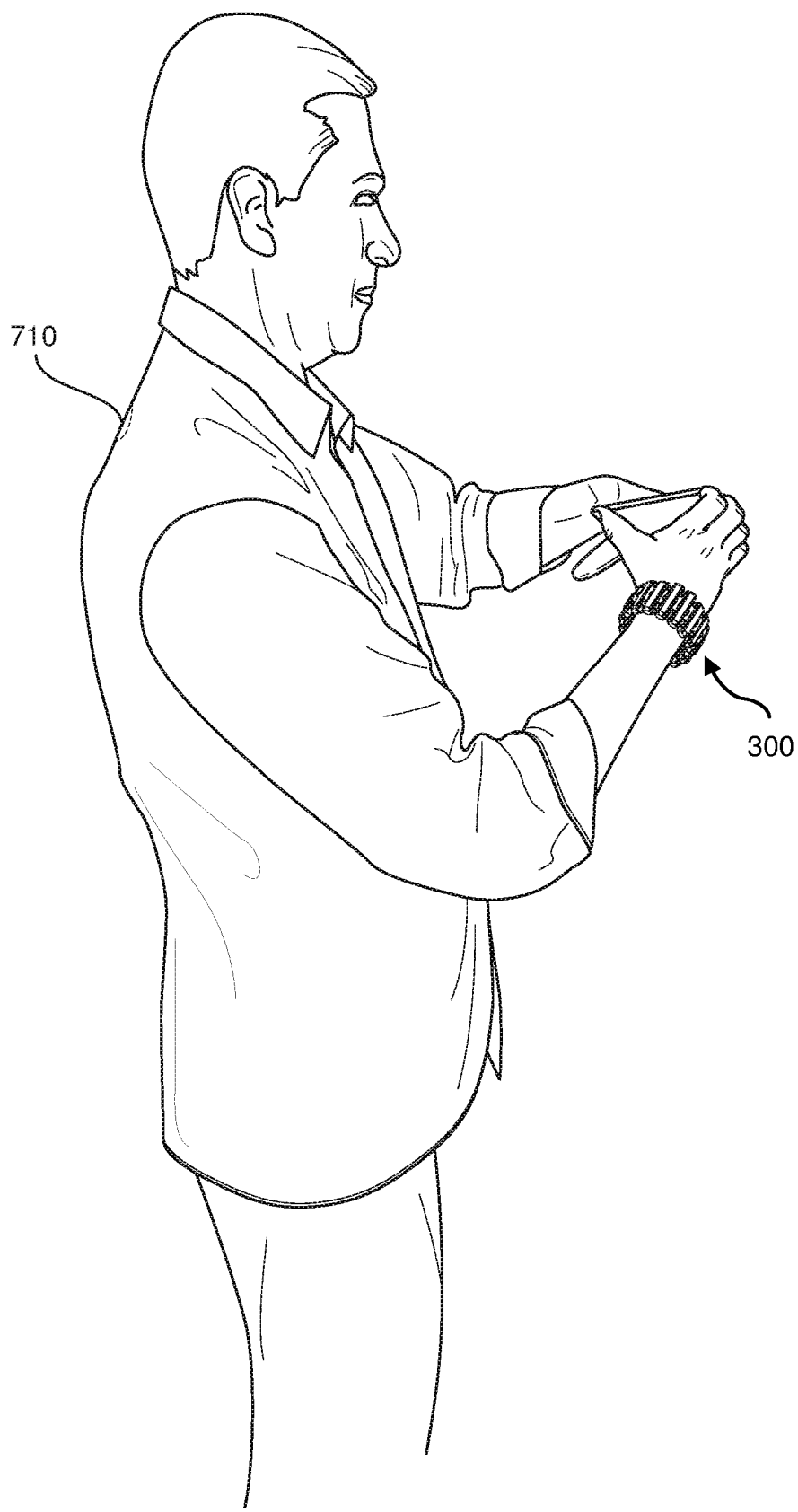
FIG. 8. Illustrates the example manufacturing task illustrated in FIG. 7 subsequent to the feedback.

FIG. 7 illustrates feedback provided by wearable device 300 during an example manufacturing task. Wearable device 300 can monitor, for example, the angle at which the operator is positioned with respect to a part being assembled through a camera-based system (or other system for identifying objects and tracking them in space) by automatically recognizing both the part and a part of the body of the operator. Additionally or alternatively, wearable device 300 may be in communication with an additional wearable device 710 on the operator's back. In some examples, wearable device 710 may include one or more EMG sensors, MMG sensors, and/or SMG sensors and provide information about neuromuscular activity that indicates a suboptimal posture. Additionally or alternatively, wearable device 710 may include one or more IMU sensors that provide information about the position, orientation, and/or movement of the operator that, in turn, indicates a suboptimal posture. Once wearable device 300 detects the suboptimal posture, wearable device 300 may provide a warning and/or instruction to the operator. For example, wearable device 300 may create a vibration 720 to signal to the user that the manufacturing task is not being performed correctly (e.g., due to suboptimal posture). In another example, wearable device 300 may send a signal to an augmented reality system (e.g., smart glasses) to cause the augmented reality system to display a warning message when the wearable device 300 has determined that the operator is holding a suboptimal posture. As shown in FIG. 8, the operator may correct their posture. Wearable devices 300 and/or 710 may collect information determining that the operator's posture has been corrected. Wearable device 300 may then terminate signals to the operator that indicate a suboptimal posture and/or send one or more signals (e.g., to an augmented reality system) indicating a correct posture.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
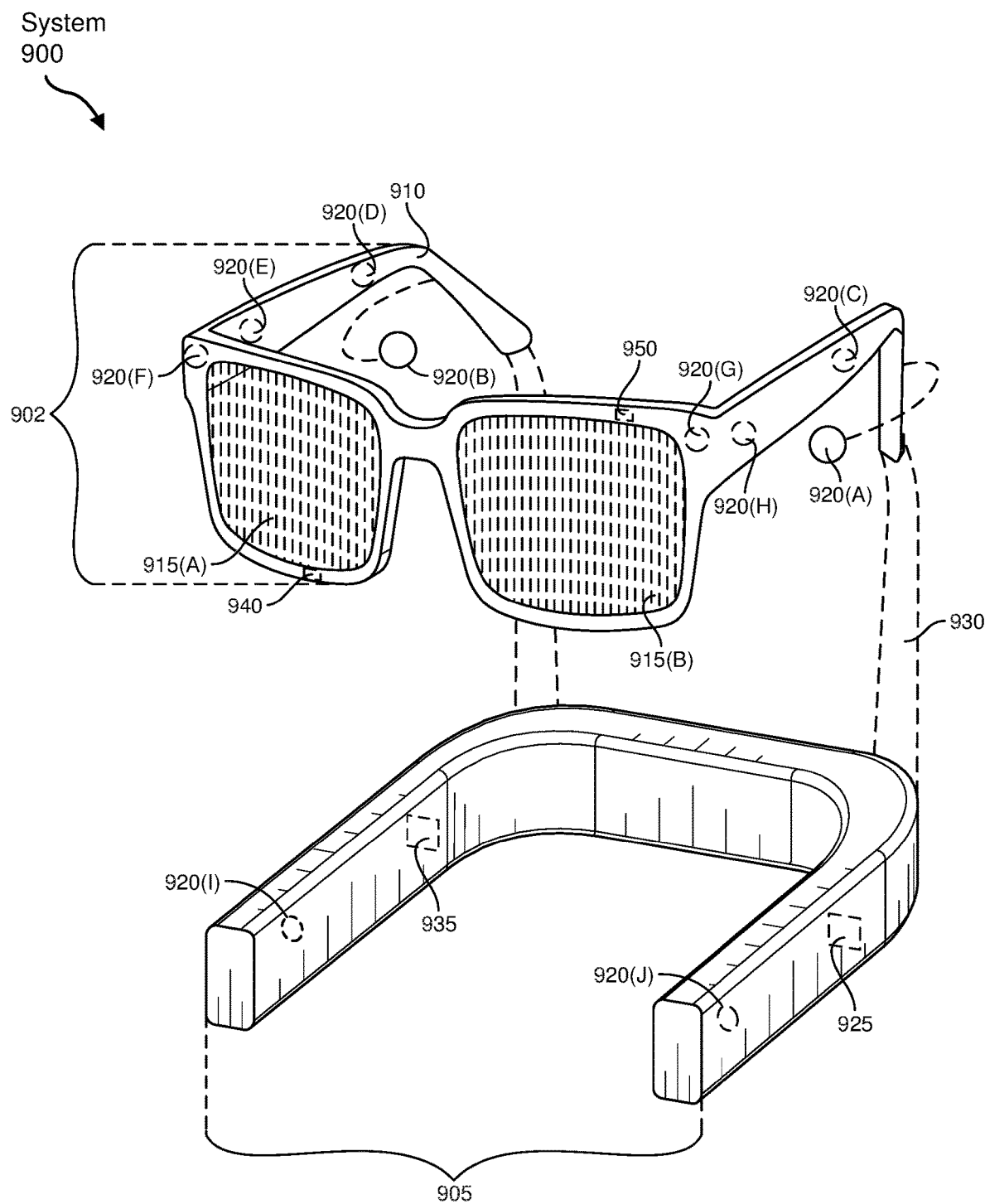
FIG. 9 is an illustration of exemplary augmented-reality glasses that may be used in connection with embodiments of this disclosure.
Figure 10:
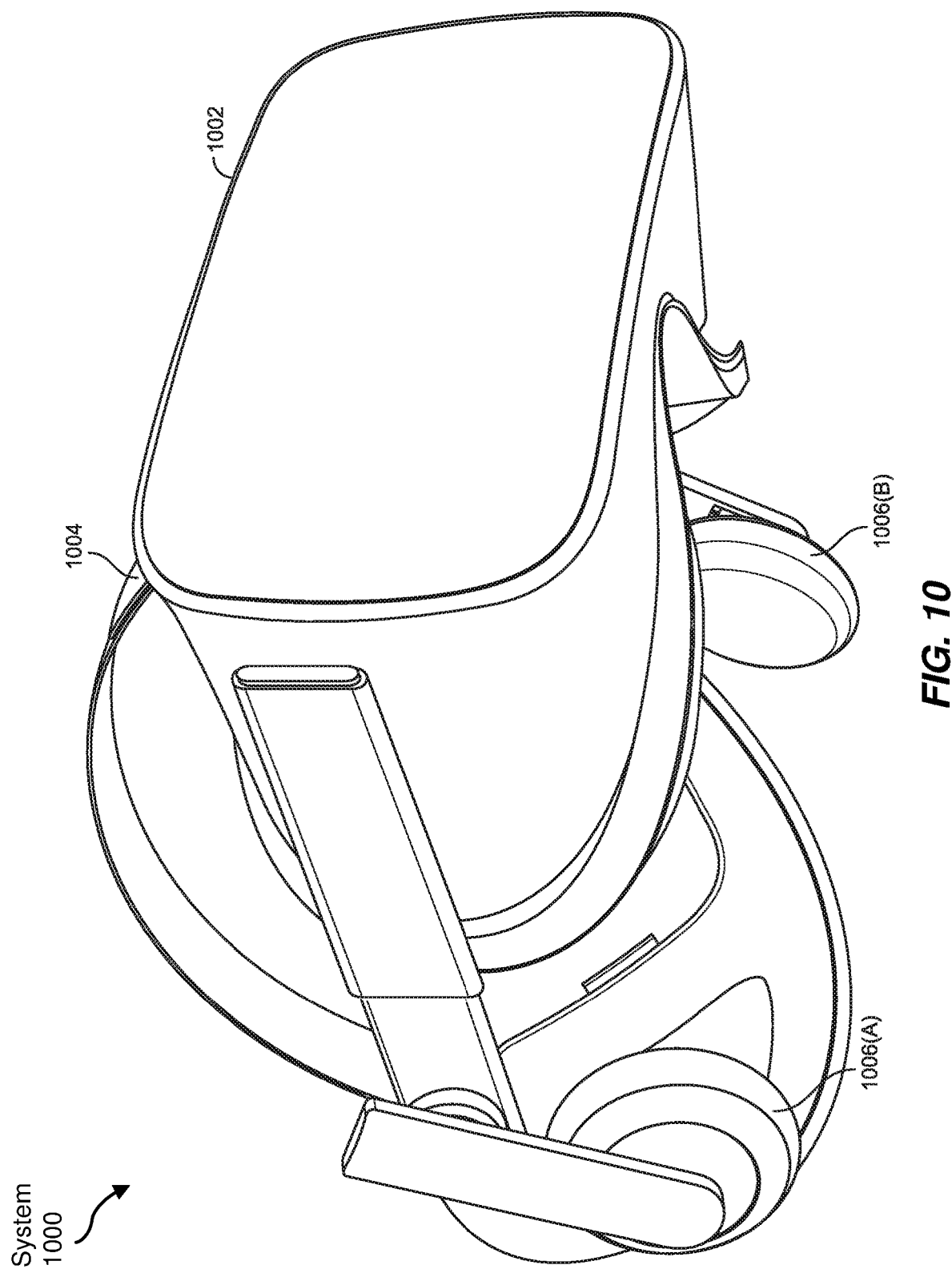
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 10 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system for providing feedback to a human operator, the system comprising:
   a wearable structure configured to be worn on a wrist of the human operator, the wearable structure including an inner surface;
   a plurality of neuromuscular sensors arranged on the inner surface of the wearable structure and configured to record a plurality of neuromuscular signals from the wrist of the human operator; and
   at least one computer processor programmed to:
      determine, based on the plurality of neuromuscular signals from the wrist of the human operator and/or information based on the plurality of neuromuscular signals from the wrist of the human operator, one or more metrics associated with a performance, by the human operator, of an ordered sequence of movements for one or more motor tasks involving a real-world object, the one or more metrics comprising one or more of:
         a force applied by the human operator to the real-world object during performance of the ordered sequence of movements for the one or more motor tasks involving the real-world object; and
         an indication of completion of one or more movements in the ordered sequence of movements for the one or more motor tasks involving the real-world object; and
      provide, via an augmented reality (AR) interface, feedback to the human operator regarding their performance of the ordered sequence of movements for the one or more motor tasks involving the real-world object, the feedback comprising one or more of:
         an indication of a difference between the force applied by the human operator to the real-world object and one or more target forces; and
         an indication of a movement in the ordered sequence of movements for the one or more motor tasks having not been fully executed.

2. The system of claim 1, wherein the at least one computer processor is further programmed to:
   provide as input to a trained statistical model, the plurality of neuromuscular signals from the wrist of the human operator and/or information based on the plurality of neuromuscular signals from the wrist of the human operator; and
   determine, based on an output of the trained statistical model, the one or more metrics associated with the performance of the ordered sequence of movements for the one or more motor tasks involving the real-world object.

3. The system of claim 1, wherein:
   the one or more metrics include information about the force applied by the human operator to the real-world object during performance of the ordered sequence of movements for the one or more motor tasks involving the real-world object; and
   the feedback comprises the indication of the difference between the force applied by the human operator to the real-world object and the one or more target forces.

4. The system of claim 1, wherein:
   the one or more metrics include the indication of completion of the one or more movements in the ordered sequence of movements for the one or more motor tasks involving the real-world object; and
   the feedback comprises the indication of the movement in the ordered sequence of movements for the one or more motor tasks having not been fully executed.

5. The system of claim 1, wherein the one or more metrics further include information associated with a position of at least a portion of the human operator relative to the real-world object during performance of the ordered sequence of movements for the one or more motor tasks involving the real-world object.

6. The system of claim 5, wherein the at least one computer processor is further programmed to monitor an angle of the at least a portion of the human operator relative to the real-world object during performance of the ordered sequence of movements for the one or more motor tasks involving the real-world object.

7. The system of claim 5, wherein the at least one computer processor is further programmed to monitor at least six degrees of freedom of an arm and/or hand of the human operator during performance of the ordered sequence of movements for the one or more motor tasks involving the real-world object.

8. The system of claim 1, wherein the one or more metrics associated with performance of the ordered sequence of movements for the one or more motor tasks involving the real-world object include information associated with a posture of the human operator during performance of the ordered sequence of movements for the one or more motor tasks involving the real-world object.

9. The system of claim 1, wherein providing the feedback to the human operator via the AR interface comprises:
  instructing an AR device in communication with the at least one computer processor to provide the feedback to the human operator in an augmented reality environment generated by the AR device.

10. The system of claim 1, wherein the one or more motor tasks comprise at least one of one or more manufacturing tasks, one or more surgical tasks, or one or more military-related tasks involving the real-world object.

11. The system of claim 1, wherein providing feedback to the human operator comprises:
  displaying one or more visual prompts to the human operator via the AR interface, the one or more visual prompts including one or more instructions regarding the performance of the ordered sequence of movements.

12. The system of claim 1, wherein providing feedback to the human operator comprises:
  prompting the human operator to change an amount of force applied during performance of the ordered sequence of movements.

13. The system of claim 1, wherein providing feedback to the human operator comprises:
  providing one or more instructions to the human operator regarding an additional amount of force to be applied to the real-world object during performance of the ordered sequence of movements.

14. The system of claim 1, wherein providing feedback to the human operator comprises:
  providing a notification to the human operator indicative of whether the ordered sequence of movements was completed properly by the human operator.

15. The system of claim 14, wherein providing feedback to the human operator further comprises, when it is determined that the ordered sequence of movements was not completed properly, providing, via the AR interface, instructions describing how to complete the ordered sequence of movements properly.

16. A system for training a human operator to perform one or more manufacturing tasks involving a real-world object, the system comprising:
  a wearable device comprising:
    a wearable structure configured to be worn on a wrist of the human operator, the wearable structure including an inner surface; and
    a plurality of neuromuscular sensors arranged on the inner surface of the wearable structure and configured to record a plurality of neuromuscular signals from the wrist of the human operator;
  an augmented reality (AR) system or a virtual reality (VR) system; and
  at least one computer processor in communication with the plurality of neuromuscular sensors and the AR or VR system, wherein the at least one computer processor is programmed to:
    instruct the AR or VR system to provide at least one prompt to the human operator about proper performance of each movement in an ordered sequence of movements for the one or more manufacturing tasks involving the real-world object;
    determine, based on the plurality of neuromuscular signals from the wrist of the human operator and/or information based on the plurality of neuromuscular signals from the wrist of the human operator, one or more metrics associated with a performance, by the human operator, of the ordered sequence of movements for the one or more manufacturing tasks involving the real-world object, the one or more metrics comprising one or more of:
      a force applied by the human operator to the real-world object during performance of the ordered sequence of movements for the one or more manufacturing tasks involving the real-world object; and
      an indication of completion of one or more movements in the ordered sequence of movements for the one or more manufacturing tasks involving the real-world object; and
    provide feedback to the human operator regarding whether the human operator has properly performed the ordered sequence of movements for the one or more manufacturing tasks involving the real-world object, the feedback comprising one or more of:
      an indication of a difference between the force applied by the human operator to the real-world object and one or more target forces; and
      an indication of a movement in the ordered sequence of movements for the one or more manufacturing tasks having not been fully executed.

17. The system of claim 16, wherein providing feedback to the human operator comprises providing feedback via the AR or VR system during performance of the ordered sequence of movements for the one or more manufacturing tasks.

18. The system of claim 16, wherein the at least one computer processor is programmed to monitor based, at least in part, on the recorded neuromuscular signals from the wrist of the human operator, the force applied to the real-world object by the human operator during performance of the ordered sequence of movements for the one or more manufacturing tasks, and
  wherein providing feedback to the human operator comprises providing information describing the monitored force.

19. The system of claim 16, wherein the at least one computer processor is further programmed to monitor based, at least in part, on the recorded neuromuscular signals from the wrist of the human operator, positions of two or more body parts of the human operator relative to the real-world object during performance of the ordered sequence of movements for the one or more manufacturing tasks, and
  wherein providing feedback to the human operator further comprises providing information describing the monitored positions.

20. A method for providing feedback to a human operator during performance of one or more manufacturing tasks involving a real-world object, the method comprising:

receiving, via a plurality of neuromuscular sensors arranged on an inner surface of a wearable structure configured to be worn on a wrist of the human operator, a plurality of neuromuscular signals from the wrist of the human operator;

determining, based on the plurality of neuromuscular signals from the wrist of the human operator and/or information based on the plurality of neuromuscular signals from the wrist of the human operator, one or more metrics associated with a performance of an ordered sequence of movements for the one or more manufacturing tasks by the human operator, the one or more metrics comprising one or more of:

a force applied by the human operator to the real-world object during performance of the ordered sequence of movements for the one or more manufacturing tasks involving the real-world object; and an indication of completion of one or more movements in the ordered sequence of movements for the one or more manufacturing tasks involving the real-world object; and providing via an augmented reality (AR) interface, feedback to the human operator regarding their performance of the sequence of movements for the one or more manufacturing tasks, the feedback comprising one or more of:

an indication of a difference between the force applied by the human operator to the real-world object and one or more target forces; and an indication of a movement in the ordered sequence of movements for the one or more manufacturing tasks having not been fully executed.

* * * * *